United States Patent
Zhao et al.

(10) Patent No.: US 9,792,871 B2
(45) Date of Patent: Oct. 17, 2017

(54) GATE DRIVER ON ARRAY CIRCUIT AND LIQUID CRYSTAL DISPLAY ADOPTING THE SAME

(71) Applicant: Wuhan China Star Optoelectronics Technology Co., Ltd., Wuhan (CN)

(72) Inventors: Mang Zhao, Wuhan (CN); Yafeng Li, Wuhan (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 109 days.

(21) Appl. No.: 14/905,967

(22) PCT Filed: Dec. 23, 2015

(86) PCT No.: PCT/CN2015/098416
§ 371 (c)(1),
(2) Date: Jan. 19, 2016

(87) PCT Pub. No.: WO2017/084144
PCT Pub. Date: May 26, 2017

(65) Prior Publication Data
US 2017/0140728 A1    May 18, 2017

(30) Foreign Application Priority Data
Nov. 18, 2015 (CN) .......................... 2015 1 0797175

(51) Int. Cl.
*G09G 3/36* (2006.01)
*G02F 1/1345* (2006.01)
*G02F 1/1368* (2006.01)

(52) U.S. Cl.
CPC ......... *G09G 3/3677* (2013.01); *G02F 1/1368* (2013.01); *G02F 1/13454* (2013.01);
(Continued)

(58) Field of Classification Search
CPC ........... G09G 3/3667; G09G 2230/021; G09G 2310/08; G02F 1/13454; G02F 1/11368
See application file for complete search history.

(56) References Cited

U.S. PATENT DOCUMENTS

2016/0019976 A1* 1/2016 Pai ....................... G09G 3/3266
345/204
2016/0180964 A1* 6/2016 Hu ......................... G11C 19/28
345/100

(Continued)

*Primary Examiner* — Amr Awad
*Assistant Examiner* — Andre Matthews (57) ABSTRACT

A GOA circuit includes GOA circuit units. When scan signal outputted by a previous stage GOA circuit unit and a next stage GOA circuit unit are at a low level, a fifth transistor controlled by the scan signal of previous stage GOA circuit unit and a sixth transistor controlled by the scan signal of a next stage GOA circuit unit turn on, so that the current stage GOA circuit unit starts to operate, and voltage of a control node becomes the same as the first constant voltage. When a third clock signal is triggered, the scan signal of the previous stage GOA circuit unit is charged from the low level, which was maintained previously, to the first constant voltage. Therefore, scan signal of GOA circuit unit will not affect the normal stage transmission of other GOA circuit units, and mitigate the problem of outputting redundant scan signal pulse.

18 Claims, 6 Drawing Sheets

(52) U.S. Cl.
CPC ........... *G09G 2300/0819* (2013.01); *G09G 2310/0251* (2013.01); *G09G 2310/08* (2013.01); *G09G 2330/021* (2013.01)

(56) References Cited

U.S. PATENT DOCUMENTS

2017/0092214 A1\* 3/2017 Xiao ................ G09G 3/3677
2017/0162149 A1\* 6/2017 Zhao ................ G09G 3/3677

\* cited by examiner

GATE DRIVER ON ARRAY CIRCUIT AND LIQUID CRYSTAL DISPLAY ADOPTING THE SAME

RELATED APPLICATIONS

This application is a National Phase of PCT Patent Application No. PCT/CN2015/098416 having International filing date of Dec. 23, 2015, which claims the benefit of priority of Chinese Patent Application No. 201510797175.4 filed on Nov. 18, 2015. The contents of the above applications are all incorporated by reference as if fully set forth herein in their entirety.

FIELD AND BACKGROUND OF THE INVENTION

The present invention relates to a liquid crystal display (LCD), and more specifically, to an LCD adopting gate driver on array (GOA) circuit.

A GOA circuit makes use of the thin-film transistor liquid crystal display (TFT-LCD) array process to form a gate driver on a GOA substrate with TFT arrays to realize a driving method of progressive scan.

A GOA circuit comprises a plurality of GOA circuit units. When a gate enabling signal turns on all GOA circuit units, scan signals outputted by each GOA circuit unit to scan lines remain at a low level. If a scan signal of a scan line cannot change from being at a low level to a high level before a clock signal arrives, the normal operation of GOA circuit units will be affected.

More specifically, a stage transmission signal inputted by a third stage GOA circuit unit is a scan signal outputted by a first stage GOA circuit. Therefore, the status of the scan signal of the first stage GOA circuit unit will affect the operation status of the third stage GOA circuit unit. Before the third stage GOA circuit unit receives a clock signal, the scan signal from the first stage GOA circuit unit is kept at a low level by a load capacitor. When a clock signal is received, the third stage GOA circuit unit is affected by the low level of the scan signal of the first stage GOA circuit unit, so that the third stage GOA circuit unit starts operating earlier than the first stage GOA circuit unit. It means that there is a redundant pulse in the scan signal outputted by the third stage GOA circuit unit. The redundant pulse will follow the stage transmission of the scan signal and affect the scan signal of the next stage GOA circuit unit. Moreover, all GOA circuit units controlled by the same clock signal, such as the third, seventh, eleventh or other circuit units will generate scan signals with redundant pulses, compromising the whole GOA circuit.

Therefore, how to form a GOA circuit that generates scan signals without redundant pulses is a goal that the industry should work on.

SUMMARY OF THE INVENTION

An object of the present invention is to provide a GOA circuit and a LCD adopting the GOA circuit so to solve the existing technical problem.

According to the present invention, a gate driver on array (GOA) circuit, comprises a plurality of GOA circuit units connected in cascade. The GOA circuit unit at each stage outputting a scan signal from an output terminal based on a scan signal outputted by a previous stage GOA circuit unit, a scan signal outputted by a next stage GOA circuit unit, a first clock signal, a second clock signal, a third clock signal, a fourth clock signal, a first enabling signal and a second enabling signal. The GOA circuit unit at each stage comprises a scan control module, an input control module electrically connected to drains of the first and second transistors for turning on the scan signals outputted by the previous stage GOA circuit unit or next stage GOA circuit unit based on the third clock signal, an output control module electrically connected to a control node for controlling the output of the scan signal based on a voltage imposed on the control node, a voltage regulating module electrically connected to the output control module, for stabilizing the voltage of the control node to prevent current leakage, a pull-up holding module electrically connected to the input control module, scan control module, output control module and voltage regulating module, for holding the control node at a high level during non-scanning periods, and holding the scan signal at a high level, and a pull-up facilitating module, electrically connected to the pull-up holding module, for controlling leakage of the input control module during the period when the control node is being charged.

The scan control module comprises: a first transistor, comprising a gate electrically connected to the first enabling signal, a source electrically connected to the scan signal outputted by a next stage GOA circuit unit; a second transistor, comprising a gate electrically connected to the second enabling signal, and a source electrically connected to the scan signal outputted by the previous stage GOA circuit unit; a third transistor, comprising a gate electrically connected to a first enabling signal, and a source electrically connected to the fourth clock signal; a fourth transistor, comprising a gate electrically connected to the second enabling signal, and a source electrically connected to the second clock signal; a fifth transistor, comprising a gate electrically connected to scan signals outputted by the next stage GOA circuit unit or the previous stage GOA circuit unit, and a source electrically connected to a first constant voltage; and a sixth transistor, comprising a gate electrically connected to scan signals outputted by a previous stage GOA circuit unit or a next stage GOA circuit unit, and a source electrically connected to a drain of the fifth transistor.

In one aspect of the present invention, the input control module comprises a seventh transistor, comprising a gate electrically connected to the third clock signal, a source electrically connected to drains of the first transistor and the second transistor.

In another aspect of the present invention, the output control module comprises: an eighth transistor, comprising a gate electrically connected to the control node, and a source electrically connected to the first clock signal; and a first capacitor, with two ends connected to the source and gate of the eighth transistor respectively.

In another aspect of the present invention, the voltage regulating module comprises a ninth transistor, comprising a drain electrically connected to a drain of the sixth transistor, a gate electrically connected to the second constant voltage, and a source electrically connected to a gate of the eighth transistor.

In another aspect of the present invention, the pull-up holding circuit comprises: a tenth transistor, comprising a drain electrically connected to the drain of the sixth transistor, a gate electrically connected to drains of the third transistor and fourth transistor, a source electrically connected to the second constant voltage; an eleventh transistor, comprising a drain electrically connected to the first constant voltage, a gate electrically connected to a drain of the tenth transistor, and a source electrically connected to a drain of the seventh transistor; a twelfth transistor, comprising a drain electrically connected to the first constant voltage, a gate electrically connected to a drain of the tenth transistor, and a source electrically connected to a drain of the eighth transistor; a thirteenth transistor, comprising a drain electrically connected to the first constant voltage, a gate electrically connected to a drain of the seventh transistor, and a source electrically connected to the drain of the tenth transistor; and a second capacitor, with two ends connected to the first constant voltage and the drain of the tenth transistor respectively.

In another aspect of the present invention, the pull-up facilitating module comprises a fourteenth transistor, comprising a drain electrically connected to the first constant voltage, a gate electrically connected to a source of the seventh transistor, and a source electrically connected to the drain of the tenth transistor.

In another aspect of the present invention, the GOA circuit at each stage further comprises a function module. The function module comprises: a fifteenth transistor, comprising a drain electrically connected to the first constant voltage, a gate electrically connected to the gate enabling signal, and a source electrically connected to the drain of the tenth transistor; and a sixteenth transistor, comprising a drain and gate electrically connected to the gate enabling signal, and a source electrically connected to the output terminal.

In still another aspect of the present invention, each transistor is a P-type metal oxide semiconductor (PMOS) transistor, a first constant voltage is at a high level, and a second constant voltage is at a low level.

In yet another aspect of the present invention, each transistor is an N-type metal oxide semiconductor (NMOS) transistor, a first constant voltage is at a low level, and a second constant voltage is at a high level.

In contrast to prior art, a scan controlling module of GOA circuit units at each stage of the GOA circuit of the present invention comprises a fifth transistor and sixth transistor. When scan signals outputted by a previous stage GOA circuit unit and a next stage GOA circuit unit are at a low level, the fifth transistor controlled by the scan signal outputted by a previous stage GOA circuit unit and the sixth transistor controlled by the scan signal outputted by a next stage GOA circuit unit are turned on, so that the GOA circuit unit of the current stage starts to operate, and the voltage of a control node becomes the same as a level of the first constant voltage. When a third clock signal is triggered, through a pathway between the control node and a previous stage GOA circuit unit, the scan signal of the previous stage GOA circuit unit is changed from the low level, which was maintained previously, to the first constant voltage. By doing so, a scan signal at each stage of GOA circuit unit will not affect the normal stage transmission of other GOA circuit units, and mitigate the problem of outputting redundant scan signal pulse.

These and other features, aspects and advantages of the present disclosure will become understood with reference to the following description, appended claims and accompanying figures.

DESCRIPTION OF SPECIFIC EMBODIMENTS OF THE INVENTION

Figure 1:
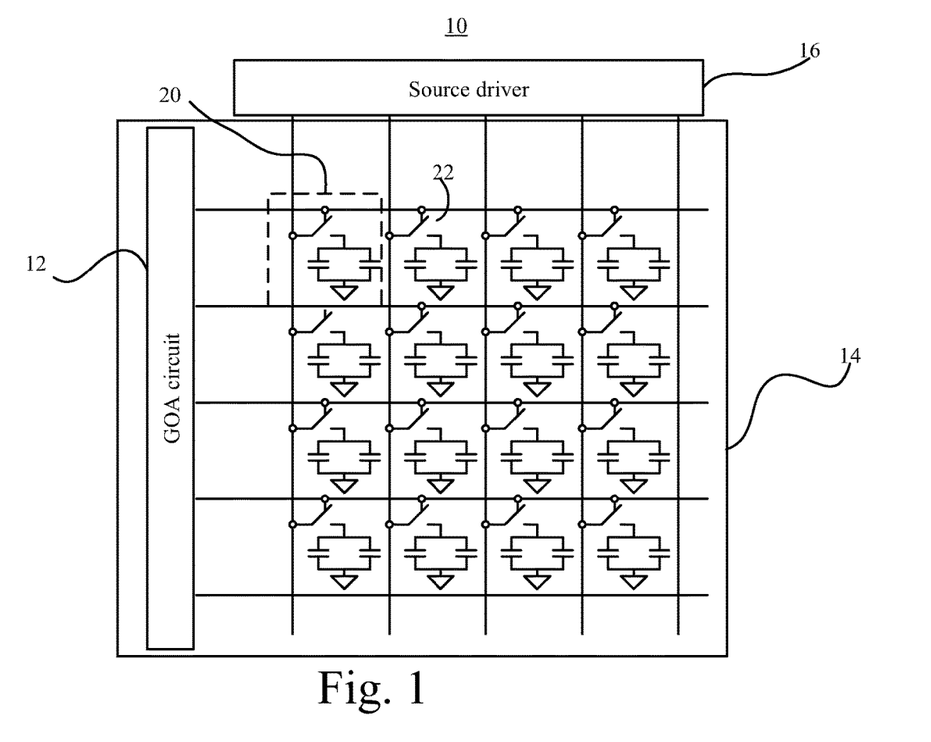
FIG. 1 is a functional block diagram of a LCD of the present invention.

Please refer to FIG. 1. FIG. 1 is a functional block diagram of a LCD 10 of the present invention. The LCD 10 comprises a substrate 14 and a source driver 16. The substrate 14 is installed with a plurality of pixels arranged in arrays and a GOA circuit 12. Each pixel is composed of three pixel units 20, representing red, green and blue (RGB) respectively. A LCD 10 with 1024×768 resolution, for example, needs 1024×768×3 pixel units 20. The GOA circuit 12 outputs a scan signal so that transistors 22 in each row are turned on one after another, while the source driver 16 outputs a corresponding data signal to a whole row of pixel units 20 so that each unit is charged to its required voltage respectively to display different gray scales. When one row completes charging, the GOA circuit 12 turns off the scan signal. Then, the GOA circuit 12 outputs a scan signal again to turn on transistors 22 in the next row, and the source driver 16 charges/discharges pixel units 20 in the next row. This process is repeated until all the pixel units 20 are charged, and then it starts from the first row again.

Existing LCD panels are designed as such that the GOA circuit 12 outputs scan signals based on a fixed interval. Take an LCD 10 with 1024×768 resolution and 60 Hz update frequency as an example: the display time for each frame is about 1/60=16.67 ms, so the pulse of each scan signal is 16.67 ms/768=21.7 µs. Within the 21.7 µs, the source driver 16 charges/discharges the pixel units 20 to the required voltages to display the corresponding gray scales.

Figure 2:
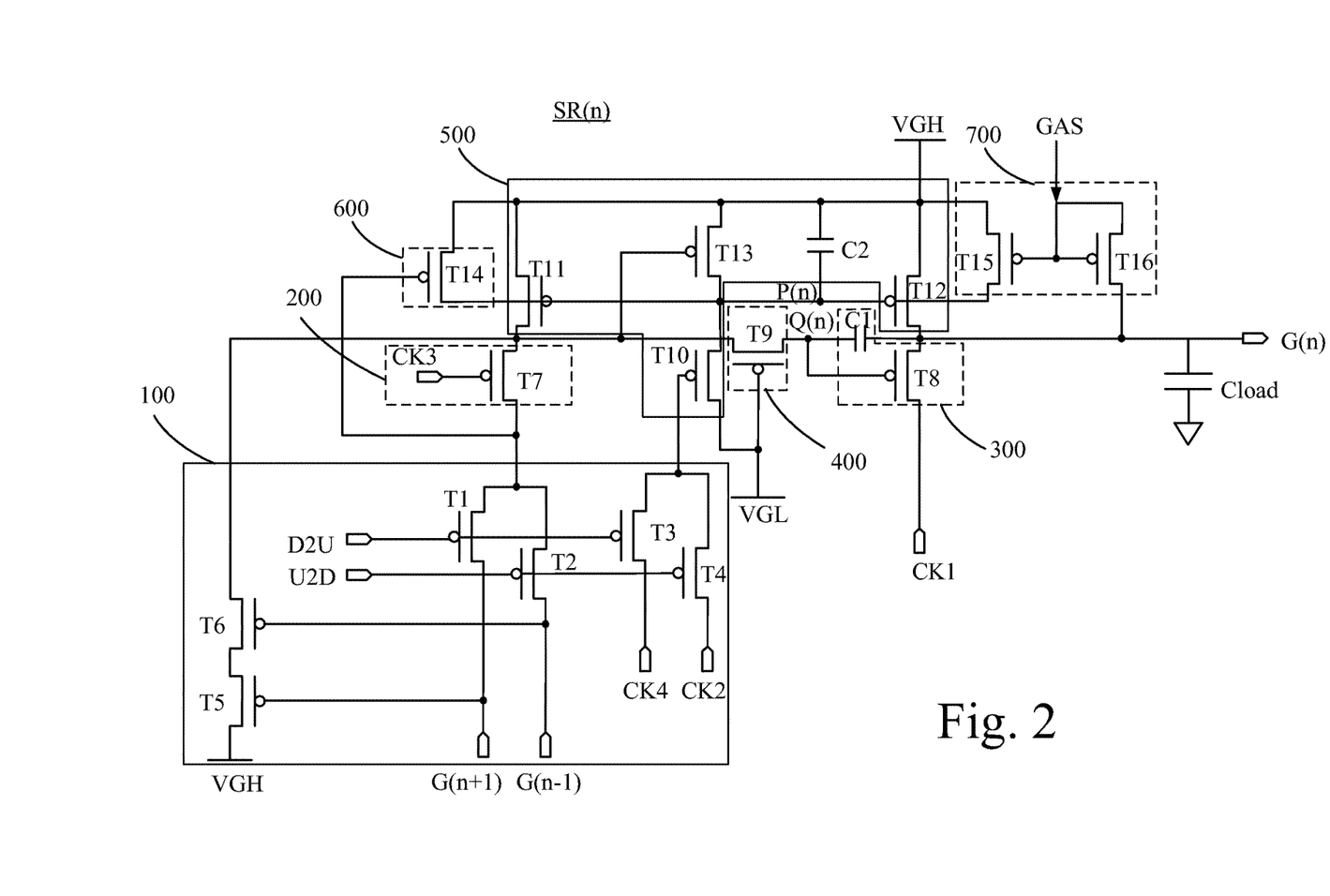
FIG. 2 is a circuit diagram of a GOA circuit unit according to a first embodiment of the present invention.

Please refer to FIG. 2. FIG. 2 is a circuit diagram of a GOA circuit unit SR(n) of a first embodiment of the present invention. The GOA circuit 12 comprises a plurality of cascade-connected GOA circuit units SR(n). The GOA circuit unit SR(n) at each stage outputs a scan signal G(n) from an output terminal based on a scan signal G(n−1) outputted by a previous stage GOA circuit unit SR(n−1), a scan signal G(n+1) outputted by a next stage GOA circuit unit SR(n+1), a first clock signal CK1, a second clock signal CK2, a third clock signal CK3, a fourth clock signal CK4, a first enabling signal D2U and a second enabling signal U2D. The GOA circuit unit SR(n) at each stage comprises a scan control module 100, an input control module 200, an output control module 300, a voltage regulating module 400, a pull-up holding module 500, a pull-up facilitating module 600, a function module 700 and a load capacitor Cload.

The scan control module 100 comprises a first transistor T1, a second transistor T2, a third transistor T3, a fourth transistor T4, a fifth transistor T5 and a sixth transistor T6. The first transistor T1 comprises a gate electrically connected to the first enabling signal D2U, a source electrically connected to the scan signal G(n+1) outputted by the next stage GOA circuit unit SR(n+1). The second transistor T2 comprises a gate electrically connected to the second enabling signal U2D, a source electrically connected to the scan signal G(n−1) of a previous stage GOA circuit unit SR(n−1). The third transistor T3 comprises a gate electrically connected to the first enabling signal D2U, a source electrically connected to the fourth clock signal CK4. The fourth transistor T4 comprises a gate electrically connected to a second enabling signal U2D, a source electrically connected a second clock signal CK2. The fifth transistor T5 comprises a gate electrically connected to the scan signal G(n+1) outputted by the next stage GOA circuit unit SR(n+1), and a source electrically connected to a first constant voltage VGH. The sixth transistor T6 comprises a gate electrically connected to the scan signal G(n−1) outputted by the previous stage GOA circuit unit SR(n−1), and a source electrically connected to a drain of the fifth transistor T5.

An input control module 200 electrically connects a drain of the first transistor T1 and a drain of the second transistor T2. It turns on the scan signal G(n−1) outputted by a previous stage GOA circuit unit SR(n−1) or the scan signal G(n+1) outputted by a next stage GOA circuit unit SR(n+1) based on the third clock signal CK3. The input control module 200 comprises a seventh transistor T7, with a gate electrically connected to the third clock signal CK3, and a source electrically connected to the drains of the first transistor T1 and second transistor T2.

An output control module 300 electrically connects a control node Q(n) to control the outputted scan signal G(n) based on a voltage imposed on the control node Q(n). The output control module 300 comprises an eighth transistor T8 and a first capacitor C1. The eighth transistor T8 comprises a gate electrically connected to the control node Q(n), and a source electrically connected to the first clock signal CK1. The two ends of the first capacitor C1 connect a source and drain of the eighth transistor T8 respectively.

The voltage regulating module 400 electrically connects the output control module 300 to stabilize the voltage of the control node Q(n) so to prevent current leakage. The voltage regulating module 400 comprises a ninth transistor T9 with a drain electrically connected to a drain of the sixth transistor T6, a gate electrically connected to a second constant voltage VGL, and a source electrically connected to a gate of the eighth transistor T8.

The pull-up holding module 500 electrically connects the scan control module 100, input control module 200, output control module 300 and voltage regulating module 400, to hold the control node Q(n) at a high level during non-scanning period, and hold the scan signal G(n) at a high level. The pull-up holding module 500 comprises a tenth transistor T10, an eleventh transistor T11, a twelfth transistor T12, a thirteenth transistor T13 and a second capacitor C2. The tenth transistor T10 comprises a drain electrically connected to a drain of the sixth transistor T6, a gate electrically connected to drains of the third transistor T3 and the fourth transistor T4, and a source electrically connected to the second constant voltage VGL. The eleventh transistor T11 comprises a drain electrically connected to the first constant voltage VGH, a gate electrically connected to a drain of the tenth transistor T10, and a source electrically connected to a drain of the seventh transistor T7. The twelfth transistor T12 comprises a drain electrically connected to the first constant voltage VGH, a gate electrically connected to the drain of the tenth transistor T10, a source electrically connected to the drain of the eighth transistor T8. The thirteenth transistor T13 comprises a drain electrically connects the first constant voltage VGH, a gate electrically connected to the drain of the seventh transistor T7, and a source electrically connected to the drain of the tenth transistor T10. The two ends of the second capacitor C2 electrically connect the first constant voltage VGH and the drain of the tenth transistor T10 respectively.

The pull-up facilitating module 600 electrically connected to the pull-up holding module 500 to control leakage of the input control module 200 when the control node Q(n) is being charged. The pull-up facilitating module 500 comprises a fourteenth transistor T14, with a drain electrically connected to the first constant voltage VGH, a gate electrically connected to the source of the seventh transistor T7, and a source electrically connected to the drain of the tenth transistor T10.

The function module 700 electrically connects the pull-up holding module 500 to control whether a GOA circuit unit SR(n) outputs the scan signal G(n) based on the gate enabling signal GAS. The function module 700 comprises a fifteenth transistor T15 and a sixteenth transistor T16. The fifteenth transistor T15 comprises a drain electrically connected to the first constant voltage VGH, a gate electrically connected to the gate enabling signal GAS, and a source electrically connected to the drain of the tenth transistor T10. The sixteenth transistor T16 comprises a drain and a gate electrically connected to the gate enabling signal GAS, and a source electrically connected to an output terminal to output the scan signal G(n).

In the embodiment shown in FIG. 2, all transistors are P-type metal oxide semiconductor (PMOS) transistors. The first constant voltage VGH is at a high level, and the second constant voltage VGL is at a low level.

Figure 3:
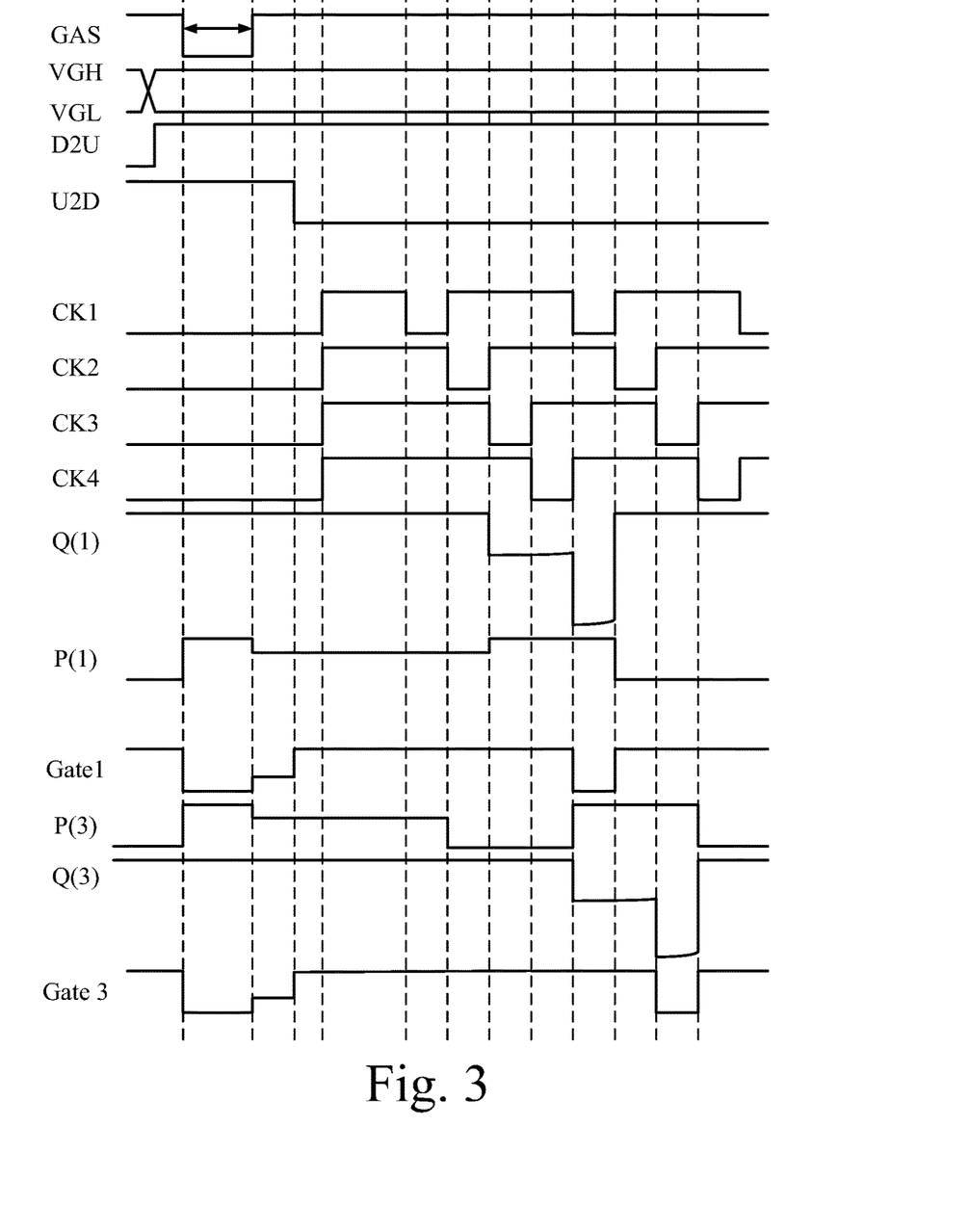
FIG. 3 is a timing diagram of various input signals, output signals and node voltages shown in FIG. 2.

Please also refer to FIG. 3. FIG. 3 is a timing diagram of all the input signals, output signals and node voltages shown in FIG. 2. When the GOA circuit unit SR(n) at each stage receives the gate enabling signal GAS, all scan lines corresponded to GOA circuit units SR(n) will start to transmit the scan signal G(n) to pixel units 20. When the second enabling signal U2D is at a low level, the second transistor T2 is turned on. At the moment, if the san signals G(n) and G(n+1) are at a low level, the transistors T5 and T6 will be turned on so that a pathway is formed between the control node Q(n) and the first constant voltage VGH. When the clock signal CK3 is at a low level, the transistor T7 is turned on so that a pathway is formed between the control node Q(n) and a scan signal (n−1). It means that the low level of the scan signal (n−1) previously maintained by the load capacitor Cload will be charged to a high level by the first constant voltage VGH. Therefore, the level of the scan signal will not affect the normal stage transmission of GOA circuit units, mitigating the problem of outputting redundant scan signal pulse.

Figure 4:
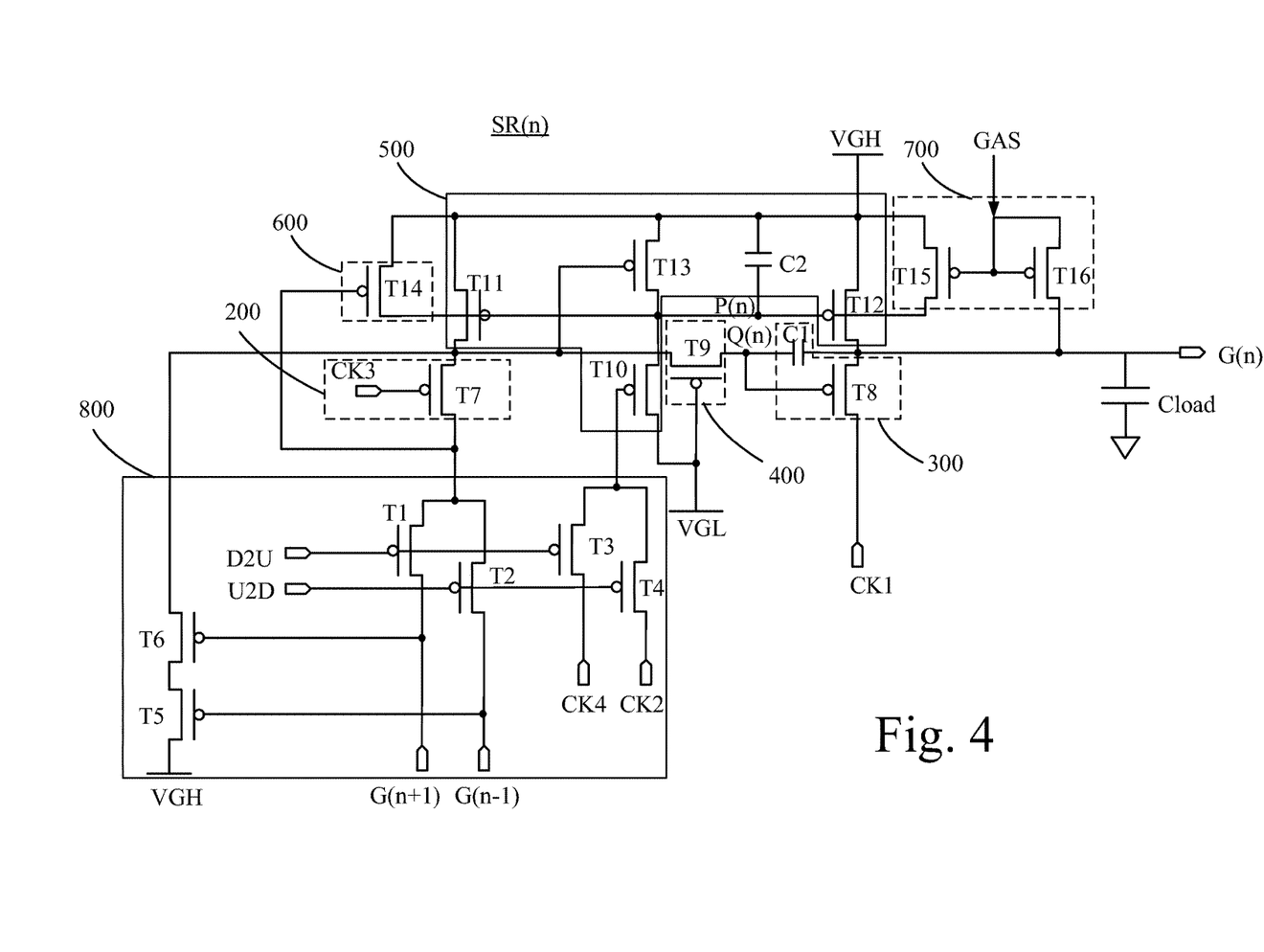
FIG. 4 is a circuit diagram of a GOA circuit unit according to a second embodiment of the present invention.

Please refer to FIG. 4. FIG. 4 is a circuit diagram of a GOA circuit unit SR(n) of a second embodiment of the present invention. Different form the scan control module 100 in FIG. 2, a scan control module 800 of a GOA circuit unit SR(n) in FIG. 4 has a fifth transistor T5 comprising a gate electrically connected to a scan signal G(n−1) outputted by a previous stage GOA circuit unit SR(n−1), and a sixth transistor T6 comprising a gate electrically connected to a scan signal G(n+1) outputted by a next stage GOA circuit unit SR(n+1). The connection and operation of other components are the same as that in FIG. 2, so no further explanation is provided here.

Figure 5:
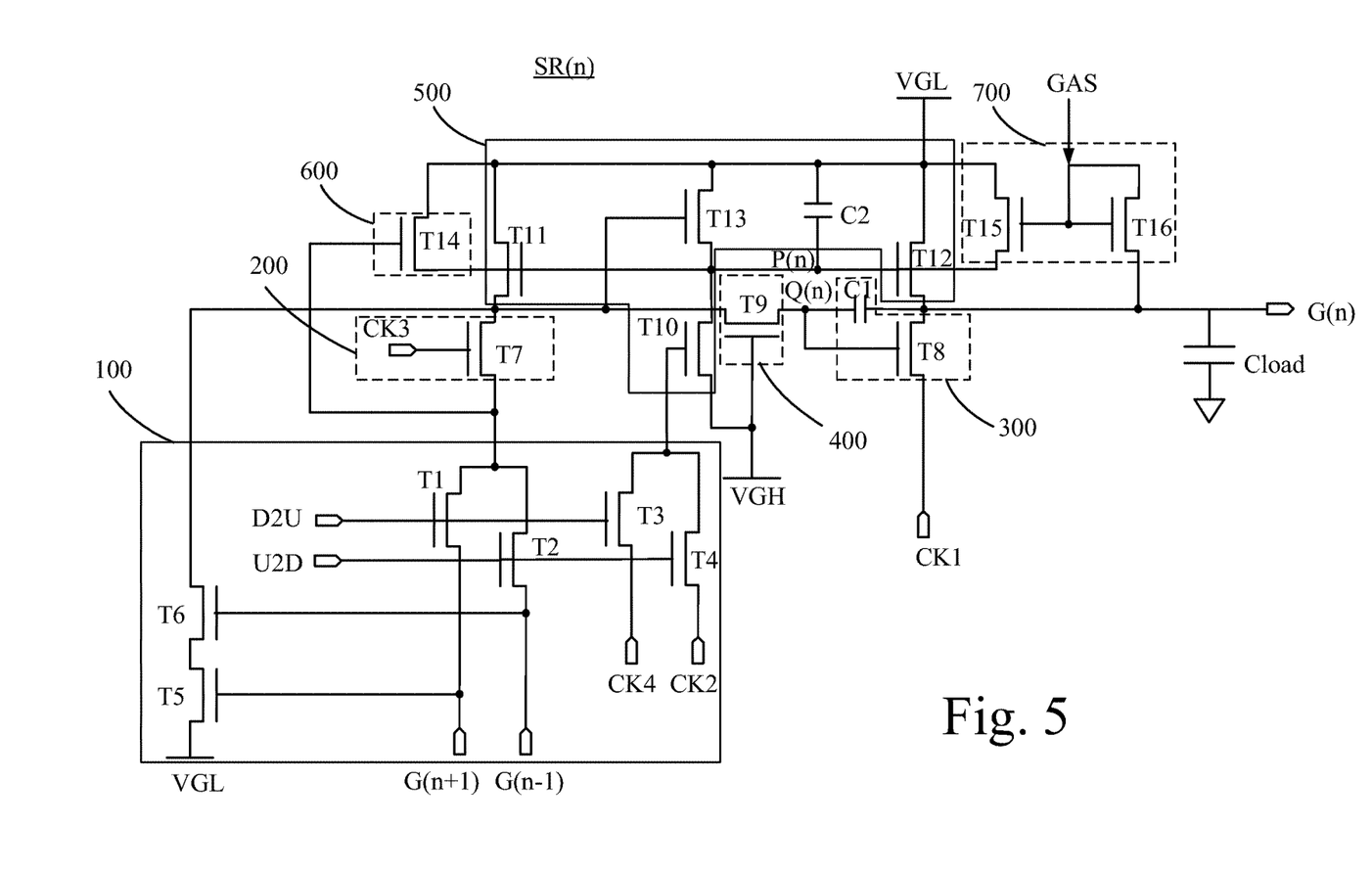
FIG. 5 is a circuit diagram of a GOA circuit unit according to a third embodiment of the present invention.

Please refer to FIG. 5. FIG. 5 is a circuit diagram of a GOA circuit unit SR(n) of a third embodiment of the present invention. Different from the scan control module 100 in FIG. 2, all GOA circuit units SR(n) in FIG. 5 are N-type metal oxide semiconductor (NMOS) transistors. A first constant voltage VGL is at a low level, and a second constant voltage VGH is at a high level. The connection and operation of components are the same as that in FIG. 2, so no further explanation is provided here.

Figure 6:
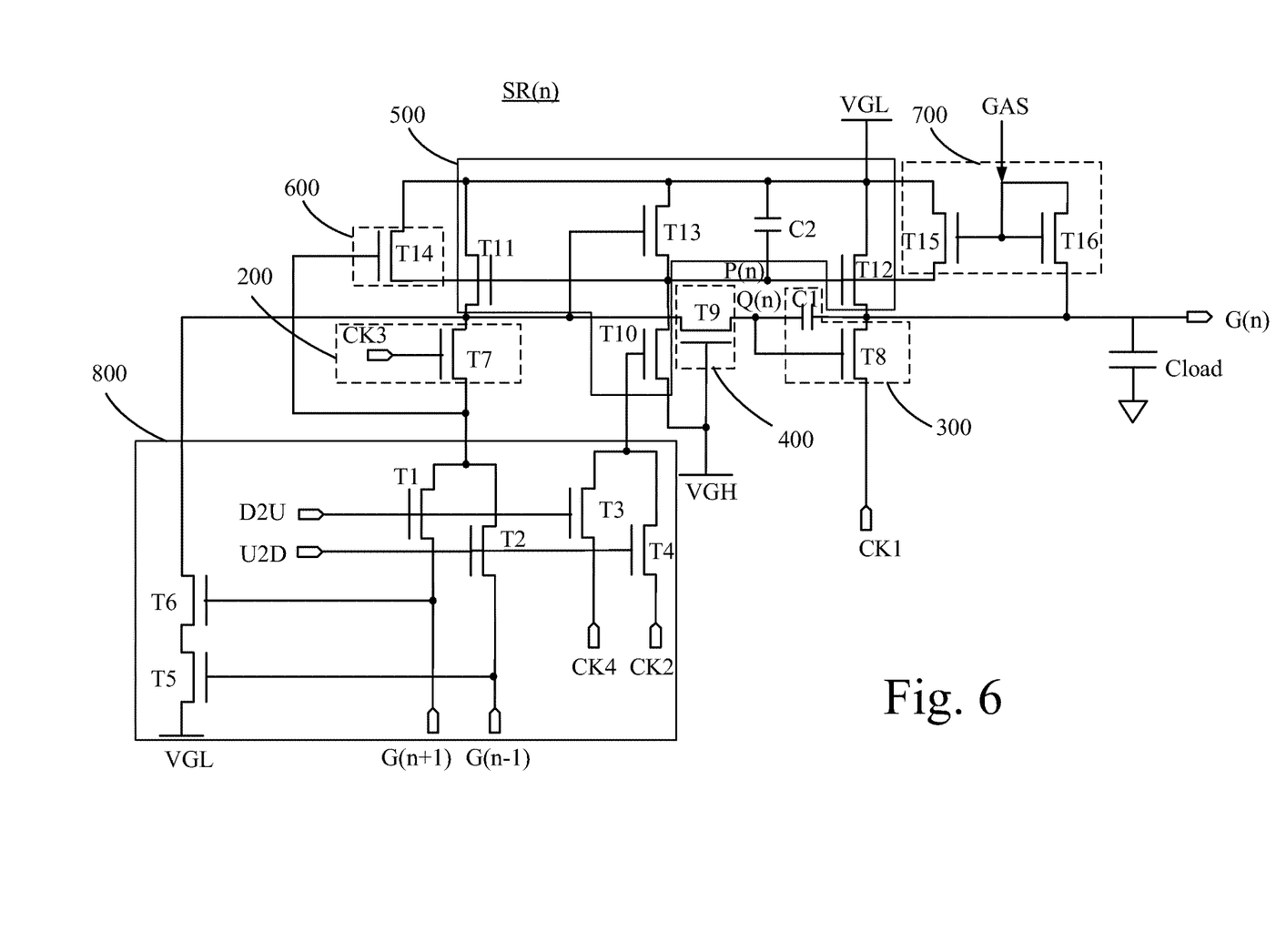
FIG. 6 is a circuit diagram of a GOA circuit unit according to a fourth embodiment of the present invention.

Please refer to FIG. 6. FIG. 6 is a circuit diagram of a GOA circuit unit SR(n) of a fourth embodiment of the present invention. Different from the scan control module 100 in FIG. 5, a scan control module 800 of the GOA circuit unit SR(n) in FIG. 6 has a fifth transistor T5 comprising a gate electrically connected to a scan signal G(n−1) outputted by a previous stage GOA circuit unit SR(n−1), and a sixth transistor T6 electrically connected to a scan signal G(n+1) outputted by a next stage GOA circuit unit SR(n+1). The connection and operation of other components are the same as that in FIG. 5, so no further explanation is provided here.

In contrast to prior art, a scan controlling module of GOA circuit units at each stage of the GOA circuit of the present invention comprises a fifth transistor and sixth transistor. When scan signals outputted by a previous stage GOA circuit unit and a next stage GOA circuit unit are at a low level, the fifth transistor controlled by the scan signal outputted by a previous stage GOA circuit unit and the sixth transistor controlled by the scan signal outputted by a next stage GOA circuit unit are turned on, so that the GOA circuit unit of the current stage starts to operate, and the voltage of a control node becomes the same as a level of the first constant voltage. When a third clock signal is triggered, through a pathway between the control node and a previous stage GOA circuit unit, the scan signal of the previous stage GOA circuit unit is changed from the low level, which was maintained previously, to the first constant voltage. By doing so, a scan signal at each stage of GOA circuit unit will not affect the normal stage transmission of other GOA circuit units, and mitigate the problem of outputting redundant scan signal pulse.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A gate driver on array (GOA) circuit, comprising:
a plurality of GOA circuit units, connected in cascade, with the GOA circuit unit at each stage outputting a scan signal from an output terminal based on a scan signal outputted by a previous stage GOA circuit unit, a scan signal outputted by a next stage GOA circuit unit, a first clock signal, a second clock signal, a third clock signal, a fourth clock signal, a first enabling signal and a second enabling signal; the GOA circuit unit at each stage comprises:
a scan control module, comprising:
a first transistor, comprising a gate electrically connected to the first enabling signal, a source electrically connected to the scan signal outputted by a next stage GOA circuit unit;
a second transistor, comprising a gate electrically connected to the second enabling signal, and a source electrically connected to the scan signal outputted by the previous stage GOA circuit unit;
a third transistor, comprising a gate electrically connected to the first enabling signal, and a source electrically connected to the fourth clock signal;
a fourth transistor, comprising a gate electrically connected to the second enabling signal, and a source electrically connected to the second clock signal;
a fifth transistor, comprising a gate electrically connected to scan signals outputted by the next stage GOA circuit unit or the previous stage GOA circuit unit, and a source electrically connected to a first constant voltage; and
a sixth transistor, comprising a gate electrically connected to scan signals outputted by a previous stage GOA circuit unit or a next stage GOA circuit unit, and a source electrically connected to a drain of the fifth transistor;
an input control module, electrically connected to drains of the first and second transistors, for turning on the scan signals outputted by the previous stage GOA circuit unit or next stage GOA circuit unit based on the third clock signal;
an output control module, electrically connected to a control node, for controlling the output of the scan signal based on a voltage imposed on the control node;
a voltage regulating module, electrically connected to the output control module, for stabilizing the voltage of the control node to prevent current leakage;
a pull-up holding module, electrically connected to the input control module, scan control module, output control module and voltage regulating module, for holding the control node at a high level during non-scanning periods, and holding the scan signal at a high level; and
a pull-up facilitating module, electrically connected to the pull-up holding module, for controlling leakage of the input control module during the period when the control node is being charged.

2. The GOA circuit of claim 1, wherein the input control module comprises a seventh transistor, comprising a gate electrically connected to the third clock signal, a source electrically connected to drains of the first transistor and the second transistor.

3. The GOA circuit of claim 2, wherein the output control module comprises:
an eighth transistor, comprising a gate electrically connected to the control node, and a source electrically connected to the first clock signal; and
a first capacitor, with two ends connected to the source and gate of the eighth transistor respectively.

4. The GOA circuit of claim 3, wherein the voltage regulating module comprises a ninth transistor, comprising a drain electrically connected to a drain of the sixth transistor, a gate electrically connected to the second constant voltage, and a source electrically connected to a gate of the eighth transistor.

5. The GOA circuit of claim 4, wherein the pull-up holding circuit comprises:
a tenth transistor, comprising a drain electrically connected to the drain of the sixth transistor, a gate electrically connected to drains of the third transistor and fourth transistor, a source electrically connected to the second constant voltage;
an eleventh transistor, comprising a drain electrically connected to the first constant voltage, a gate electrically connected to a drain of the tenth transistor, and a source electrically connected to a drain of the seventh transistor;
a twelfth transistor, comprising a drain electrically connected to the first constant voltage, a gate electrically connected to a drain of the tenth transistor, and a source electrically connected to a drain of the eighth transistor;
a thirteenth transistor, comprising a drain electrically connected to the first constant voltage, a gate electrically connected to a drain of the seventh transistor, and a source electrically connected to the drain of the tenth transistor; and a second capacitor, with two ends connected to the first constant voltage and the drain of the tenth transistor respectively.

6. The GOA circuit of claim 5, wherein the pull-up facilitating module comprises:
 a fourteenth transistor, comprising a drain electrically connected to the first constant voltage, a gate electrically connected to a source of the seventh transistor, and a source electrically connected to the drain of the tenth transistor.

7. The GOA circuit of claim 5, wherein the GOA circuit at each stage further comprises:
 a function module, comprising:
  a fifteenth transistor, comprising a drain electrically connected to the first constant voltage, a gate electrically connected to the gate enabling signal, and a source electrically connected to the drain of the tenth transistor; and
  a sixteenth transistor, comprising a drain and gate electrically connected to the gate enabling signal, and a source electrically connected to the output terminal.

8. The GOA circuit of claim 7, wherein each transistor is a P-type metal oxide semiconductor (PMOS) transistor, the first constant voltage is at a high level, and the second constant voltage is at a low level.

9. The GOA circuit of claim 7, wherein each transistor is an N-type metal oxide semiconductor (NMOS) transistor, the first constant voltage is at a low level, and the second constant voltage is at a high level.

10. A liquid crystal display, comprising:
 a source driver, for outputting data signal to a plurality of pixel units to show images; and
 a gate driver on array (GOA) substrate, comprising:
  a plurality of GOA circuit units, connected in cascade, with the GOA circuit unit at each stage outputting a scan signal from an output terminal based on a scan signal outputted by a previous stage GOA circuit unit, a scan signal outputted by a next stage GOA circuit unit, a first clock signal, a second clock signal, a third clock signal, a fourth clock signal, a first enabling signal and a second enabling signal, wherein the GOA circuit unit at each stage comprises:
   a scan control module, comprising:
    a first transistor, comprising a gate electrically connected to the first enabling signal, a source electrically connected to the scan signal outputted by a next stage GOA circuit unit;
    a second transistor, comprising a gate electrically connected to the second enabling signal, and a source electrically connected to the scan signal outputted by the previous stage GOA circuit unit;
    a third transistor, comprising a gate electrically connected to the first enabling signal, and a source electrically connected to the fourth clock signal;
    a fourth transistor, comprising a gate electrically connected to the second enabling signal, and a source electrically connected to the second clock signal;
    a fifth transistor, comprising a gate electrically connected to scan signals outputted by the next stage GOA circuit unit or the previous stage GOA circuit unit, and a source electrically connected to a first constant voltage; and
    a sixth transistor, comprising a gate electrically connected to scan signals outputted by a previous stage GOA circuit unit or a next stage GOA circuit unit, and a source electrically connected to a drain of the fifth transistor;
   an input control module, electrically connected to drains of the first and second transistors, for turning on the scan signals outputted by the previous stage GOA circuit unit or next stage GOA circuit unit based on the third clock signal;
   an output control module, electrically connected to a control node, for controlling the output of the scan signal based on a voltage imposed on the control node;
   a voltage regulating module, electrically connected to the output control module, for stabilizing the voltage of the control node to prevent current leakage;
   a pull-up holding module, electrically connected to the input control module, scan control module, output control module and voltage regulating module, for holding the control node at a high level during non-scanning periods, and holding the scan signal at a high level; and
   a pull-up facilitating module, electrically connected to the pull-up holding module, for controlling leakage of the input control module during the period when the control node is being charged.

11. The liquid crystal display of claim 10, wherein the input control module comprises a seventh transistor, comprising a gate electrically connected to the third clock signal, a source electrically connected to drains of the first transistor and the second transistor.

12. The liquid crystal display of claim 11, wherein the output control module comprises:
 an eighth transistor, comprising a gate electrically connected to the control node, and a source electrically connected to the first clock signal; and
 a first capacitor, with two ends connected to the source and gate of the eighth transistor respectively.

13. The liquid crystal display of claim 12, wherein the voltage regulating module comprises a ninth transistor, comprising a drain electrically connected to a drain of the sixth transistor, a gate electrically connected to the second constant voltage, and a source electrically connected to a gate of the eighth transistor.

14. The liquid crystal display of claim 13, wherein the pull-up holding circuit comprises:
 a tenth transistor, comprising a drain electrically connected to the drain of the sixth transistor, a gate electrically connected to drains of the third transistor and fourth transistor, a source electrically connected to the second constant voltage;
 an eleventh transistor, comprising a drain electrically connected to the first constant voltage, a gate electrically connected to a drain of the tenth transistor, and a source electrically connected to a drain of the seventh transistor;
 a twelfth transistor, comprising a drain electrically connected to the first constant voltage, a gate electrically connected to a drain of the tenth transistor, and a source electrically connected to a drain of the eighth transistor;
 a thirteenth transistor, comprising a drain electrically connected to the first constant voltage, a gate electrically connected to a drain of the seventh transistor, and a source electrically connected to the drain of the tenth transistor; and
 a second capacitor, with two ends connected to the first constant voltage and the drain of the tenth transistor respectively.

15. The liquid crystal display of claim 14, wherein the pull-up facilitating module comprises:
a fourteenth transistor, comprising a drain electrically connected to the first constant voltage, a gate electrically connected to a source of the seventh transistor, and a source electrically connected to the drain of the tenth transistor.

16. The liquid crystal display of claim 14, wherein the GOA circuit at each stage further comprises:
a function module, comprising:
a fifteenth transistor, comprising a drain electrically connected to the first constant voltage, a gate electrically connected to the gate enabling signal, and a source electrically connected to the drain of the tenth transistor; and
a sixteenth transistor, comprising a drain and gate electrically connected to the gate enabling signal, and a source electrically connected to the output terminal.

17. The liquid crystal display of claim 16, wherein each transistor is a P-type metal oxide semiconductor (PMOS) transistor, the first constant voltage is at a high level, and the second constant voltage is at a low level.

18. The liquid crystal display of claim 16, wherein each transistor is an N-type metal oxide semiconductor (NMOS) transistor, the first constant voltage is at a low level, and the second constant voltage is at a high level.

\* \* \* \* \*